United States Patent Office 2,895,817
Patented July 21, 1959

2,895,817

HERBICIDAL METHOD AND COMPOSITION EMPLOYING SUBSTITUTED PHENYL PARABANIC ACIDS

Raymond W. Luckenbaugh, Wilmington, Del., assignor to E. I. du Pont de Nemours and Company, Wilmington, Del., a corporation of Delaware No Drawing. Application April 12, 1956
Serial No. 577,656

2 Claims. (Cl. 71—2.5)

This invention relates to herbicidal compositions and methods employing certain alkyl phenyl and substituted phenyl parabanic acids as active ingredients.

I have found that certain alkyl phenyl and substituted phenyl parabanic acids possess outstanding herbicidal activity. When employed in herbicidal compositions and methods, these compounds are outstandingly effective for the control of undesired vegetation.

The substituted parabanic acids that have been found to possess outstanding herbicidal activity are those represented by the following formula (1)

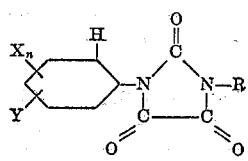

wherein X and Y are selected from the group consisting of hydrogen, halogen, and alkyl groups containing less than 5 carbon atoms; $n$ is a positive integer less than 4, that is 1, 2 or 3; and R is an alkyl group containing less than 5 carbon atoms.

X and Y in Formula 1 above preferably are hydrogen or chlorine, and R preferably is methyl. Where the phenyl ring is substituted with one or more chlorines, the most preferred compounds are those in which there is chlorine on the para position of the benzene nucleus.

The substituted parabanic acids used in the compositions and methods of the present invention can be prepared by any conventional means. Thus, they can be prepared in accordance with the following equation:

(2)

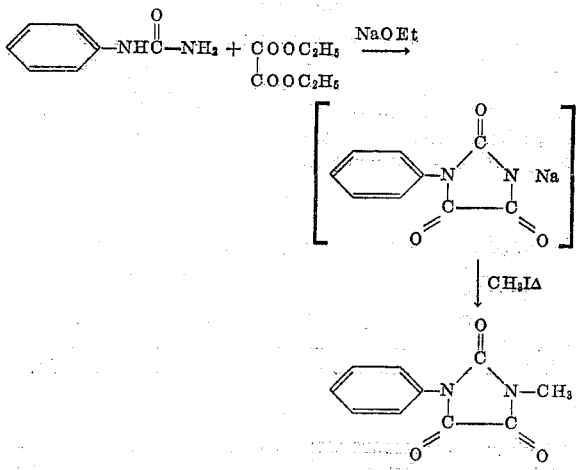

Preparation in accordance with this method is described in detail by Todd and Whittaker, J. Chem. Soc. 628–33 (1946).

An alternative method of preparing these compounds, particularly the halogen-substituted compounds, is by reacting a monomethyl phenylurea, such as monomethyl parachlorophenylurea, with oxalyl chloride.

The substituted parabanic acid compounds of the invention are crystalline solids that are characterized by extreme insolubility in water.

Illustrative of the compounds of the invention represented by Formula 1 above are the following:

1-methyl-3-phenylparabanic acid
1-methyl-3-paratolylparabanic acid
1-methyl-3-metatolylparabanic acid
1-methyl-3-orthotolylparabanic acid
1-methyl-3-paraethylphenylparabanic acid
1-methyl-3-(p-isopropylphenyl)parabanic acid
1-methyl-3-(m-isobutylphenyl)parabanic acid
1-methyl-3-(3,4-dichlorophenyl)parabanic acid
1-methyl-3-(3,5-dibromophenyl)parabanic acid
1,methyl-3-(3,4-dimethylphenyl)parabanic acid
1-methyl-3-(3-methyl-4-chlorophenyl)parabanic acid
1-methyl-3-(p-chlorophenyl)parabanic acid
1-methyl-3-(3,4,5-trifluorophenyl)parabanic acid
1-methyl-3-(p-iodophenyl)parabanic acid
1-ethyl-3-(p-chlorophenyl)parabanic acid
1-isopropyl-3-(p-chlorophenyl)parabanic acid
1-sec.butyl-3-(p-chlorophenyl)parabanic acid The compounds of Formula 1 are highly effective in preventing undesirable plant growth. While certain of the compounds are effective contact herbicides to control established weeds, the most outstanding characteristic of these compounds is their unusual effectiveness as pre-emergence herbicides.

Many of the compounds, particularly those where the phenyl group is unsubstituted or monosubstituted, can be used as herbicides for germinating weed seedlings with little hazard to growing crop plants, because of the relatively low contact herbicidal activity of these compounds at the dosages employed. On the other hand, those compounds where the phenyl group is polysubstituted, such as 1-methyl-3-(3,4-dichlorophenyl)parabanic acid, are active contact herbicides. Of particular importance, certain of these compounds, such as 1-methyl-3-phenyl parabanic acid and 1-methyl-3-(p-chlorophenyl)parabanic acid, have been found to be extremely effective in controlling crabgrass in established turf. These compounds can also be used as a post-emergence crop spray with pre-emergence weed control for late-emerging weeds.

In order to utilize the herbicidal activity of the substituted parabanic acids of the invention to the best advantage, the compounds are formulated in admixture with a carrier material or conditioning agent of the kind used and referred to in the art as a pest control adjuvant or modifier. This provides formulations adapted for ready and efficient application to soil, weeds, or unwanted plants using conventional applicator equipment. Thus, the herbicidal compositions of the invention are in the form of solutions, dusts, water dispersible powders, aqueous dispersions, and emulsions.

Pest control adjuvants such as dusts, solvents, wetting, dispersing and emulsifying agents set out in U.S. Patent 2,426,417 can be employed in preparing the herbicidal compositions of the present invention. Other wetting, dispersing, and emulsifying agents such as those listed in detail in Bulletin E 607 of the Bureau of Entomology and Plant Quarantine of the U.S. Department of Agriculture, and such as those set out in an article by McCutcheon in Chemical Industries, November 1947, page 811, entitled "Synthetic Detergents," can also be used.

The preferred herbicidal compositions of the present invention are in the form of water dispersible powders. These can be prepared by admixing one or more of the substituted parabanic acids with a surface-active dispersing agent and a finely divided solid carrier or dust such as talc, pyrophyllite, natural clays, diatomaceous earths and other powdered diluents such as those set out in the aforementioned U.S. patent. The surface-active dispersing agent is used in amount sufficient to impart water dispersibility to the powder.

Dust compositions can be prepared by admixing one or more of the substituted parabanic acids with a finely divided carrier such as those set forth in the aforementioned U.S. patent.

Liquid herbicidal compositions can be prepared by intimately dispersing one or more of the substituted parabanic acids in a conventional liquid herbicidal carrier, such as water or a herbicidal oil. For example, effective liquid compositions can be prepared by vigorously milling together a herbicidal oil such as kerosene and a substituted parabanic acid. Such a liquid composition can be prepared in the form of a concentrate that subsequently can be extended with a herbicidal oil. If an emulsifier is included in the oil concentrate, it can also be extended to sprayable concentrations with water.

The content of substituted parabanic acid in the herbicidal compositions of the invention will vary according to the manner in which and the purpose for which the composition is to be applied but, in general, will be from 0.5 to 95% by weight of the composition.

The herbicidal method of the present invention comprises applying a substituted parabanic acid of Formula 1, ordinarily in a herbicidal composition of the aforementioned type, to the locus or area to be protected from undesirable plant growth. The active compound is, of course, applied in amount sufficient to exert the desired herbicidal action. The application can be made directly upon the locus or area and the vegetation thereon during the period of infestation. Preferably, however, the substituted parabanic acid compound is applied directly to the soil prior to weed infestation, that is, as a pre-emergence treatment. When used in this way it may be desirable to include a fertilizer or another soil pesticide, such as a soil fungicide or nematocide.

In order that the invention can be better understood, the following examples are given in addition to those set forth above:

Example 1

The following wettable powder herbicidal compositions are prepared by the conventional technique of blending the active ingredient with the inert powder carrier, the wetting agent and the dispersant, and then grinding the mixture in an impact mill to an average particle size below 50 microns, followed by reblending of the resultant powder until it is completely homogeneous.

A

| | Percent |
|---|---|
| 1-methyl-3-phenylparabanic acid | 80 |
| Dry attapulgite | 16.7 |
| Sodium lauryl sulfate | 1.5 |
| Lignin sulfonate, sodium salt | 1.0 |
| $Na_2HPO_4$ | 0.8 |

B

| | |
|---|---|
| 1-methyl-3-(3,4-dichlorophenyl)parabanic acid | 80 |
| Dry attapulgite | 17.25 |
| Akyl naphthalene sulfonate | 1.75 |
| Lignin sulfonate, sodium salt | 1.0 |

C

| | |
|---|---|
| 1-methyl-3-(3,4,5-trifluorophenyl)parabanic acid | 50 |
| China clay | 48.95 |
| Alkyl naphthalene sulfonate | 0.8 |
| Methyl cellulose, low viscosity | 0.25 |

D

| | |
|---|---|
| 1-methyl-3-(p-tolyl)parabanic acid | 80 |
| Diatomaceous silica | 17.5 |
| Sodium N-methyl-N-oleoyl taurate | 1.5 |
| Na, phenol-formaldehyde sulfonate polymer | 1.0 |

These wettable powder compositions, when extended with water to form a sprayable composition containing 1% by weight of the active ingredient, are applied at a rate of 30 pounds/acre to plots seeded with a variety of annual weeds including crabgrass. These treatments give excellent kill of the germinating weeds.

Composition A is applied to another plot containing established Blue Grass Lawn at a rate of ten pounds/acre of the active ingredient prior to germination and emergence of crabgrass seeds in the area. The composition is applied in the form of a sprayable composition containing 5% by weight of the active ingredient in a water carrier. A conventional compression type hand sprayer is used. It is found that this treatment gives excellent control of the crabgrass without excessive damage of the Blue Grass.

Example 2

The following dust herbicidal compositions are prepared by first blending the active ingredient with the minor absorptive diluent, grinding this mixture until the average particle size is less than 50 microns, then blending the resultant powder with the major diluent until a homogeneous dust formulation is obtained.

A

| | Percent |
|---|---|
| 1-methyl-3-(p-chlorophenyl)parabanic acid | 10 |
| Dry attapulgite | 10 |
| Talc | 80 |

B

| | |
|---|---|
| 1-methyl-3-(m-isobutylphenyl)parabanic acid | 20 |
| Diatomaceous silica | 20 |
| Pyrophyllite | 59.5 |
| Alkyl naphthalene sulfonate | 0.5 |

C

| | |
|---|---|
| 1-isopropyl-3-(3,4-dichlorophenyl)parabanic acid | 15 |
| Talc | 25 |
| Tobacco dust | 60 |

D

| | |
|---|---|
| 1-ethyl-3-(p-chlorophenyl)parabanic acid | 10 |
| Dry attapulgite | 10 |
| Tobacco dust | 79.5 |
| Sodium N-methyl-N-oleoyl taurate | 0.5 |

This dust compositions, when applied by hand in early spring around the base of telephone poles at the rate of 60 pounds/acre, give excellent control of weeds in the treated area.

Example 3

The following aqueous dispersions are prepared by vigorously milling the listed ingredients in a sand mill until the average particle size is below 5 microns. The resultant compositions are extremely stable thixotropic suspensions that form relatively stable dilute sprayable compositions upon being extended with water.

A

| | Percent |
|---|---|
| 1-methyl-3-(3,4-dichlorophenyl) parabanic acid | 30 |
| Hydrated attapulgite | 1.75 |
| Lignin sulfonate, sodium salt | 15 |
| Sodium pentachlorophenate | 0.5 |
| $Na_2HPO_4$ | 0.8 |
| Water | 51.95 |

B

| | |
|---|---|
| 1-methyl-3-phenylparabanic acid | 40 |
| Polycarboxymethylene | 0.25 |
| Polyvinyl alcohol, low viscosity | 0.75 |
| Water | 59.0 |

Composition A is applied at the rate of 10 pounds/acre extended with 80 gallons of water to a field planted with corn. Excellent pre-emergence weed control is obtained without excessive crop damage.

Composition B is extended with water to give a sprayable formulation containing 10 pounds of the formulation in 80 gallons. This sprayable formulation is applied with a tractor-mounted sprayer at the rate of 10 pounds/acre as a post-emergence treatment on corn. This treatment gives excellent control of subsequently emerging weeds without causing excessive damage of the established corn.

*Example 4*

The following oil dispersion herbicidal compositions are prepared by grinding the listed ingredients for one hour in a sand mill.

A

|  | Percent |
|---|---|
| 1-ethyl-3-(p-chlorophenyl)parabanic acid | 25 |
| Hydrated attapulgite | 3 |
| Alkyl aryl polyether alcohol | 5 |
| Diesel oil | 67 |

B

| 1-ethyl-3-(m-bromophenyl)parabanic acid | 30 |
|---|---|
| Fatty amine, polyethylene oxide condensate | 5 |
| Amine bentonite | 2 |
| Diesel oil | 63 |

These compositions are extended with a herbicidal oil to form a sprayable oil formulation containing 2% by weight of the active ingredient. When sprayed from a railroad spray car along a railroad right of way at the rate of 50 pounds/acre of the active ingredient, excellent control of undesirable vegetation is obtained.

I claim:

1. The method for the control of undesired vegetation comprising applying to the locus to be protected, in an amount sufficient to exert herbicidal action, a compound represented by the formula:

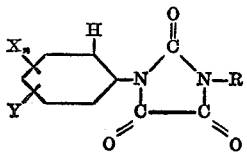

wherein X and Y are selected from the group consisting of hydrogen, halogen, and alkyl groups containing less than 5 carbon atoms; $n$ is a positive integer less than 4, and R is an alkyl group containing less than 5 carbon atoms.

2. A wettable powder herbicidal composition comprising an inert powdered carrier, a surface-active agent and, in an amount sufficient to exert herbicidal action, a compound represented by the formula

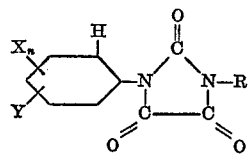

wherein X and Y are selected from the group consisting of hydrogen, halogen, and alkyl groups containing less than 5 carbon atoms; $n$ is a positive integer less than 4, and R is an alkyl group containing less than 5 carbon atoms.

References Cited in the file of this patent

UNITED STATES PATENTS

| 2,390,941 | Jones | Dec. 11, 1945 |
|---|---|---|
| 2,670,282 | Allen | Feb. 23, 1954 |

FOREIGN PATENTS

| 634,036 | Germany | Aug. 14, 1936 |
|---|---|---|

OTHER REFERENCES

Beilstein's Handbuch der Organischen Chemie, Band XXIV, p. 455 (1936).

Todd et al. J. Chem. Soc. London, 1946, pp. 628–33.